United States Patent [19]
Nesseth

[11] Patent Number: 5,178,233
[45] Date of Patent: Jan. 12, 1993

[54] CONTINUOUS LUBRICATION METHOD AND APPARATUS

[75] Inventor: Raymond P. Nesseth, Barron, Wis.

[73] Assignee: NTH, Inc., Barron, Wis.

[21] Appl. No.: 698,468

[22] Filed: May 10, 1991

[51] Int. Cl.⁵ .............................................. F16N 11/04
[52] U.S. Cl. ................................. 184/45.1; 384/469; 384/471
[58] Field of Search ...................... 184/45.1, 55.1, 87, 184/5.1; 384/469, 471

[56] References Cited

U.S. PATENT DOCUMENTS

| | | | |
|---|---|---|---|
| 552,569 | 1/1896 | Wysong | 384/469 |
| 582,824 | 5/1897 | Leavenworth | 384/469 |
| 1,696,774 | 12/1928 | Martin | 184/45.1 |
| 2,855,614 | 10/1958 | Simon | 184/45.1 |
| 3,804,476 | 4/1974 | Nakamura et al. | 384/469 |
| 4,005,913 | 2/1977 | Thomson | 308/6 |
| 4,106,816 | 8/1978 | August | 301/108 |
| 4,190,133 | 2/1980 | Ploeger | 184/1 |
| 4,375,246 | 3/1983 | Tietje | 184/45 |
| 4,477,235 | 10/1984 | Gilmer et al. | 417/414 |
| 4,758,100 | 7/1988 | Guttinger | 384/471 |
| 4,836,334 | 6/1989 | Vermeiren et al. | 184/45.1 |
| 4,941,550 | 7/1990 | Blake | 184/5.1 |

FOREIGN PATENT DOCUMENTS 0012960 9/1888 United Kingdom ................ 184/87

Primary Examiner—Ira S. Lazarus
Assistant Examiner—Alan B. Cariaso
Attorney, Agent, or Firm—Merchant, Gould, Smith, Edell, Welter & Schmidt

[57] ABSTRACT

A method and apparatus for applying continuous uniform pressure to lubricant within a lubricant reservoir are disclosed. Memory retentive material, when inserted within a lubricant reservoir, compresses when initially subjected to lubricant pressure and later expands back to its original shape as lubricant seeps from the reservoir, thereby applying pressure to the lubricant to maintain constant lubricant pressure within the reservoir.

21 Claims, 2 Drawing Sheets

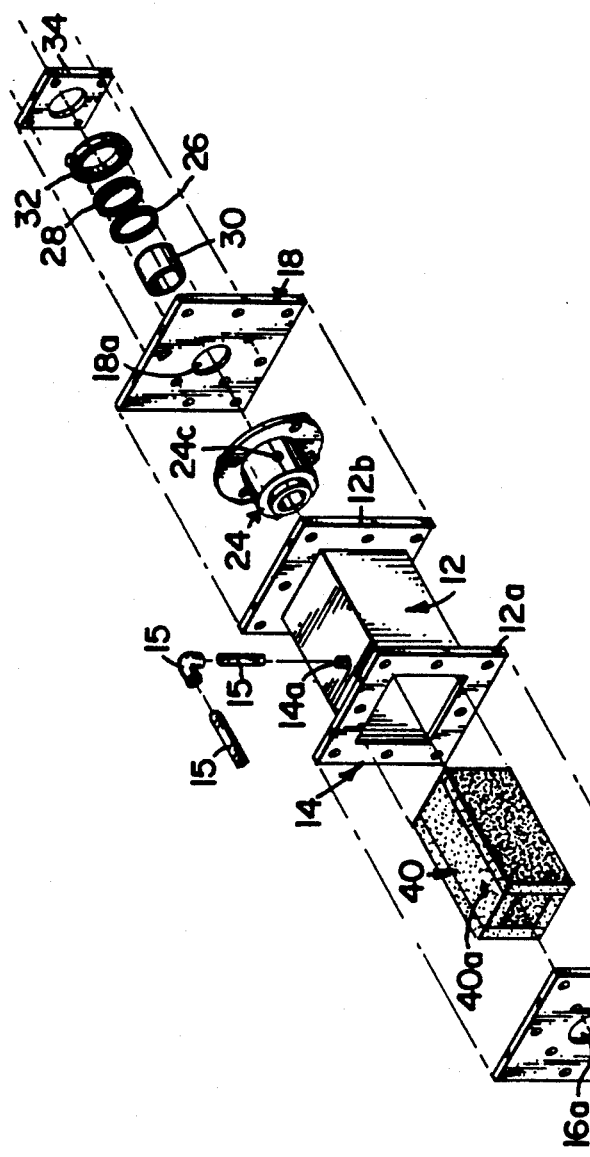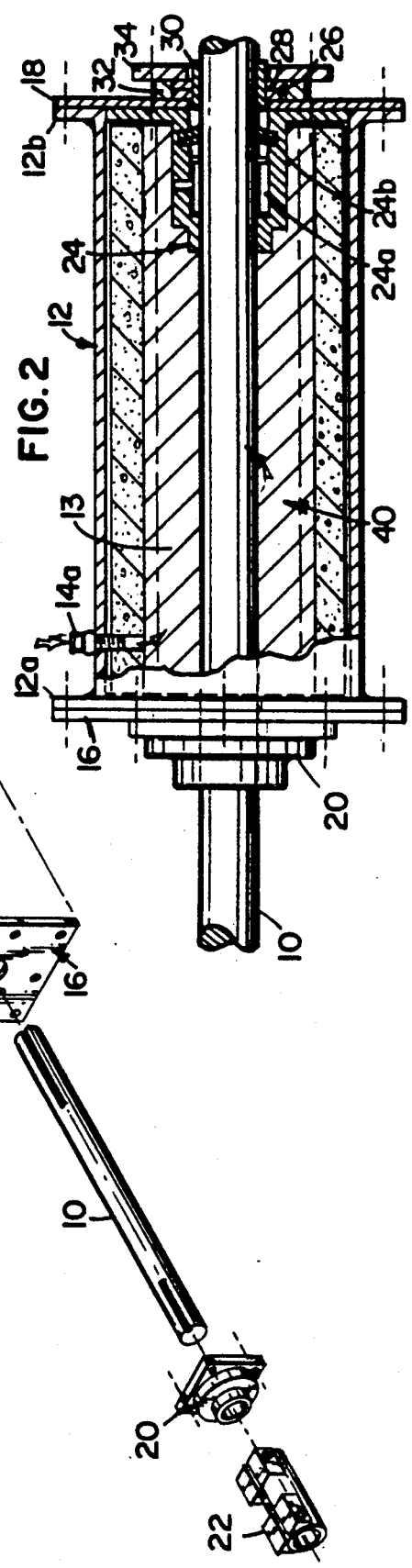
FIG. 1
FIG. 2

CONTINUOUS LUBRICATION METHOD AND APPARATUS

FIELD OF THE INVENTION

This invention relates generally to lubrication techniques, and more particularly to an apparatus and method for enhancing lubrication properties of an oil or grease containing chamber of the type suitable for supplying lubricant to bearings or the like.

BACKGROUND OF THE INVENTION

The need for providing continuous lubrication to bearings and other parts subject to frictional engagement with moving parts has long been recognized. Such need is particularly acute in those applications wherein the bearing is directly exposed to severe environments which cause rapid deterioration or wear to the bearing if not continuously lubricated.

Providing proper lubrication to a bearing can in many instances be achieved by simply packing the bearing with grease or oil, and providing one or more seals between the bearing and the external environment. This technique is generally adequate where the structure is not directly exposed to severe external or pressurized environments. However, in applications wherein a bearing seal is exposed to variable pressures such that the external environment pressure may exceed that of the internal lubricant chamber which supplies lubricant to the bearing, the probability of seal failure and consequent bearing damage significantly increases. Also, in applications wherein the protective bearing seal members are directly exposed to chemically abrasive environments, seal deterioration and consequent bearing failure is significantly accelerated.

In such applications, it is desirable to maintain a positive pressure differential between the inside of the lubricant containing chamber for the bearing and the external environment such that the lubricant pressure provides support for the bearing's protective seal against changing environmental back-pressures. Creating such a positive pressure differential across the protective seal also provides self-lubrication of the seal as lubricant seeps past the seal into the external environment, thus protectively coating the seal and shielding it from chemically abrasive external environments.

Various methods for implementing continuous-lubrication structures for addressing the above-described concerns are known in the art. However, in general, such prior art techniques have either been labor-intensive so as to require virtually continuous operator monitoring, or have been fairly complex and expensive and/or have required apparatus designed specifically for one particular lubrication application. For example, one way of providing a continuous positive pressure head to a lubrication chamber is to continuously add lubricant under pressure to the chamber during operative use. Such technique either requires continuous operator presence or automated lubricant-injection apparatus for injecting grease or other lubricant into the lubrication chamber. The problems associated with this approach are further complicated by the fact that the lubricant must often be pumped through small tubes over significant distances before reaching the remotely located lubricant reservoir. In cold weather the lubricant becomes stiff and unmanageable to accurately control.

Another technique for providing a lubrication with a positive pressure head has been to design self-lubricating chambers, generally configured to include a piston or spring-loaded biasing means associated with the chamber such that continuous or preprogrammed pressure is applied to the lubricant within the chamber so as to provide a positive pressure differential across the protective outer seal. Such structures, while performing the desired function, generally require designs that are specifically dedicated to the shape and configuration of each particular lubrication chamber and often require maintenance and lower the reliability of the entire structure. Besides, such structures are generally not practical for accurately maintaining pressure heads through long narrow tubes to remotely located reservoirs.

The present invention provides a simple and highly effective method and apparatus for maintaining a positive lubricant pressure head to a bearing or other structure requiring constant lubrication and to its associated protective seals. The present invention is applicable to lubrication chambers having varied types of lubricants (i.e., oil, grease, etc.), to lubrication chambers of virtually any shape, and can be readily adapted to existing lubrication chambers without costly retrofit expenses for parts or labor.

SUMMARY OF THE INVENTION

The present invention provides a method and apparatus for enhancing lubrication of parts subjected to potential exposure to severe environmental conditions. The present invention provides a simple, cost-effective and reliable method for maintaining a positive pressure lubricant supply to bearings and the like. According to one aspect of the invention, there is provided a method of pressurizing a sealed lubricant-containing reservoir comprising the steps of:

A. at least partially filling the reservoir with compressible memory retentive material;
B. adding lubricant to the reservoir; and
C. pressurizing the reservoir to a reservoir pressure so as to compress the memory retentive material, whereby as the reservoir pressure tends to decrease over time, the material expands to maintain the reservoir pressure. The step of pressurizing the reservoir may be performed by adding lubricant to the reservoir. According to one aspect of the invention, the memory retentive material comprises closed-celled foam material. The memory retentive material may assume various configurations ranging from a lining of the lubricant reservoir to randomly configured filling pieces such as spherical balls or the like.

According to another aspect of the invention, there is provided a method of providing lubrication to a bearing apparatus of the type having a sealable lubricant reservoir operatively connected to provide lubrication to a bearing surface and at least one seal member for sealing the reservoir and protecting the bearing surface from an external environment, comprising the steps of:

A. at least partially filling the reservoir with closed-cell foam material;
B. adding lubricant to the reservoir; and
C. pressurizing the reservoir to a positive pressure relative to that of the external environment, wherein the lubricant is urged toward the bearing surface as the foam material expands.

According to yet another aspect of the invention, there is provided a dynamically pressurized lubricant-providing apparatus comprising:

A. a lubricant-containing reservoir containing a pressurized internal chamber having an inlet port for accepting lubricant to the chamber and an outlet port arranged and configured to deliver lubricant from the chamber;

B. means for selectively sealing the inlet port;

C. seal means operatively connected at the outlet port for sealably closing the internal chamber to an external environment; and D. compressible memory retentive material at least partially filling the internal chamber, wherein the foam material is compressible by lubricant within the chamber such that the material when compressed provides biasing pressure to lubricant within the chamber for maintaining a positive pressure differential across the seal means as measured from the inside of the internal chamber to the external environment.

According to yet another aspect of the invention, there is provided a dynamically pressurized lubricating bearing apparatus for supporting a rotating shaft about a shaft axis, comprising:

A. a lubricant reservoir having an outer shell defining an enclosed internal cavity wherein the shell has a first port arranged and configured to enable a rotatable shaft to pass therethrough so as to extend from the internal cavity and through the first port to an external environment, and also an inlet port suitable for receiving lubricant into the internal cavity;

B. bearing means cooperatively mounted relative to the first port for rotatably supporting a shaft for rotation about its axis through the first port;

C. seal means operatively mounted at said first port and in cooperative engagement with the shaft for sealably closing the internal cavity about the shaft from the external environment and for protecting the bearing means from the external environment; and D. compressible closed-cell foam means operatively disposed within the internal cavity for maintaining when compressed, pressure on lubricant within the internal cavity so as to create a positive pressure differential across the seal means as measured between the internal cavity and the external environment.

While the present invention will be described with respect to lubrication chambers of particular shapes and configurations, it will be understood that the invention is not limited to such chamber shapes. Similarly, while the invention will be described with respect to several preferred embodiments of compressible foam configurations, the invention is not to be limited to such preferred embodiments or even to the use of closed-celled foam material for the compressible memory retentive material. In like manner, while the invention will be described with respect to the use of grease or oil lubricants, it will be apparent to those skilled in the art that the principles of the invention are not limited to such lubricants but apply to lubricants in general. Further, while the invention is described herein with regard to its use with specific bearing members and for its use in association with rotatably supporting drive shafts, it will be appreciated that the principles of the invention are not confined to such applications. These and other modifications and applications of the invention will become apparent to those skilled in the art in light of the following description of preferred embodiments of this invention.

BRIEF DESCRIPTION OF THE DRAWING

Referring to the Drawing, wherein like numerals represent like parts throughout the several views.

FIG. 1 is an exploded diagrammatic perspective view of one embodiment of a bearing lubrication structure illustrating the principles of the present invention;

FIG. 2 is a cross-sectional view of the lubricating structure of FIG. 1, generally taken along the Line 2—2 of FIG. 1;

DETAILED DESCRIPTION OF THE INVENTION

Figure 3:
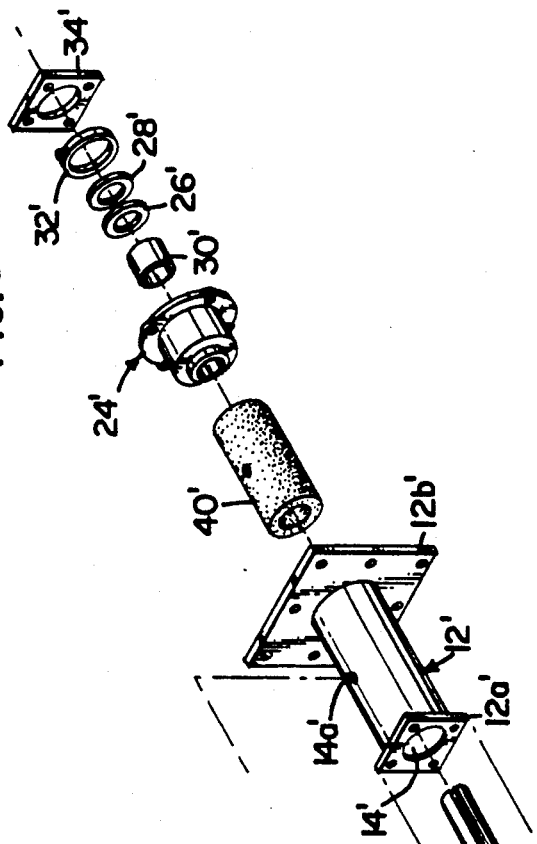
FIG. 3 is an exploded diagrammatic perspective view of a second embodiment of a bearing lubrication structure illustrating the principles of the present invention.

A first embodiment of a dynamically pressurized lubricant-providing apparatus is illustrated in FIGS. 1 and 2. The illustrated embodiment provides continual lubrication for a bearing member that supports a rotatable shaft. Such lubrication apparatus is used for example in waste pit or slurry pump and agitation apparatus wherein the lubrication unit is remotely located from the drive unit and is directly submerged within the acidic waste material. In such applications, the drive end of a shaft is typically enclosed within a protective housing and is protected from the external environment; however, the bearing structure located closest to the work-producing end of the shaft is generally directly exposed to the external environment. In operative use, such waste material can be highly corrosive and damaging to the seal and bearing portions of such apparatus, if not properly and continually lubricated during operative use. An example of apparatus that could employ the lubrication apparatus as disclosed in the preferred embodiments of this invention, is described in U.S. Pat. No. 4,836,687. To the extent that the general disclosures of such patent are applicable to a better understanding of an end use application for the present invention, such disclosures are herein incorporated by reference.

With reference to the embodiment of the invention illustrated in FIGS. 1 and 2, that portion of the apparatus located to the left of the figures will for convenience be referred to as the "front" portion of the assembly; whereas that portion of the apparatus located to the right of the figure will be disclosed as the "back" portion of the assembly. The front portion of the assembly is operatively connected to the primary drive means (not illustrated) which provides the rotative motive force for the drive shaft 10. A lubricant storage reservoir 12 is, in the embodiment illustrated in FIGS. 1 and 2, configured to define a rectangular inner chamber or cavity 14 extending between a forward flange mounting plate 12a and a rear flange mounting plate 12b. A forward bearing plate 16 is configured for cooperative sealing mounting to the forward flange mounting plate 12a by appropriate securing means (not illustrated), and a rear bearing plate 18 is configured for sealing mounting engagement to the rear flange mounting plate 12b by appropriate securing means (not illustrated).

The forward and rear bearing plates 16 and 18 have circular apertures 16a and 18a respectively formed therein and coaxially aligned with one another along the longitudinal axis of the storage reservoir 12 so as to cooperatively accept the drive shaft 10 therethrough for rotatable motion, as hereinafter described in more detail.

The drive shaft 10 is rotatably supported by the forward bearing plate 16 by means of a forward bearing 20. The bearing 20 is directly mounted to the forward bearing plate 16 and is coaxially aligned with the circular aperture 16a of the forward bearing plate. In the preferred embodiment, a spacer collar member 22 is coaxially mounted to the shaft 10, forward of the bearing 20. In the preferred embodiment, an elongated tubular sealing enclosure (not illustrated) is secured to the forward bearing plate 16, protecting the bearing 20 and other elements located forward thereof along the drive shaft 10, from the external environment. Accordingly, in the preferred embodiment, the forward bearing 20 is not directly exposed to harmful external environments, and can be of a type which is permanently lubricated and has lifetime seals cooperatively engaging the drive shaft 10. Such bearings are well known in the art and need not be described in further detail herein. In the preferred embodiment, bearing 20 is of a type F3Y228E3 flanged bearing manufactured by Rexnord Corporation. The internal lip seals of the forward bearing 20 provide sealing closure for the forward end of the lubricant storage reservoir 12.

The rear end of the lubricant storage reservoir 12 is typically directly exposed to the external environment. In the applications in which the lubrication apparatus of the preferred embodiment are generally used, such external environments are abrasive and potentially damaging to bearing and seal members located at the rear end of the reservoir. The drive shaft 10 is supported at the rear end of the storage reservoir 12 by means of a rear bearing 24 that is directly mounted to the rear bearing plate 18 in coaxial alignment with the circular aperture 18a in the bearing plate. Such mounting axially places the entire bearing assembly within the inner cavity 14 of the lubricant storage reservoir 12 and enables direct lubrication of the bearing 24 by lubricant stored within the storage reservoir 12. When connected to the rear bearing plate 18, the axial aperture of the rear bearing 24 in cooperation with the circular aperture 18a of the rear bearing plate 18 cooperatively define an exit port from the inner cavity 14 through which the drive shaft 10 passes. In the preferred embodiment, the rear bearing 24 has a plurality of roller bearing members, generally illustrated at 24a which collectively define a bearing surface for rotatably supporting the shaft 10. The bearing 24 also has one or more one-way lip flanges, generally illustrated at 24b which cooperatively engage the outer surface of the drive shaft 10 and which yieldably retain lubricant within the storage reservoir 12. Both the roller bearing members 24a and the lip seals 24b are directly lubricated by lubricant within the lubricant storage reservoir 12. In the preferred embodiment illustrated, the rear bearing 24 is a type FB22428H bearing manufactured by Rexnord Corporation. In the preferred embodiment, the rear bearing 24 has an additional grease fitting aperture (generally designated at 24c) formed through its outer housing for providing additional lubrication to the internal roller bearing surfaces.

Sealing of the rear portion of the lubricant storage reservoir 12 is completed by a pair of lip seal members 26 and 28 which are secured to a sleeve member 30 which is fixedly secured to the shaft 10. The lip seals 26 and 28 are slidably mounted on the sleeve 30 and are held in place by means of a seal retainer band 32. The entire outrigger seal assembly (26, 28, 30 and 32) is coaxially secured against the rear bearing plate 18 by means of an outer plate retainer 34, by appropriate securing fasteners (not illustrated). The lip retainer seals 26 and 28 provide the rearmost seal between the inner cavity 14 and the external environment.

Lubricant is introduced into the inner cavity 14 of the lubricant storage reservoir 12 through a lubricant input port 14a to which is connected a grease tube, generally designated at 15. The grease tube is in practice operatively connected to an appropriate source of grease or other lubricant (not illustrated) which can be selectively pumped into the inner cavity 14 when desired, to fill the cavity 14 with lubricant. Such grease or lubricant supply sources are well known in the art and will not be detailed herein.

Heretofore, in order to provide a continual positive lubricant pressure, relative to the external environment, within the inner cavity 14 of the storage reservoir 12, it was necessary to provide continual pressurized injection of grease or other lubricant into the inner cavity 14 by means of the lubricant supply line 15. Such action required continuous operator monitoring of the lubricant pressure within the inner cavity 14. Further, over-lubrication of the internal cavity 14 could result in blown seals, thereby reducing the pressure within the internal cavity 14 to that of the external environment. In order to directly address this problem, the present invention provides for introducing a self-biasing memory retentive material directly within the internal cavity 14 of the lubricant storage reservoir 12. Such material is illustrated at 40 in FIGS. 1 and 2. In the embodiment illustrated in FIGS. 1 and 2, the biasing material is sized and configured from a plurality of rectangular pieces which cooperatively define an inner lining of the inner cavity of the lubricant storage reservoir 12. The material selected for the self-biasing feature is preferably a closed-celled foam material capable of being compressed when subjected to compressive force, but having a flexibility which restores the material to its original shape as the compressive force is reduced. In essence, the closed-celled foam material acts as a sheet spring to provide a biasing force back to the lubricant along its entire surface when compressed. Such biasing material could be, for example, elastomeric material falling within the general classification of a closed-celled foam material having the property of resilient compressibility such that release of compressive force applied to the foam material enables the material to re-expand to its original configuration. Obviously, proper selection of the particular foam material to be used in any application would depend upon the type of lubricant being used such that the foam material is chemically compatible with the lubricant and would not be subject to deterioration when exposed to such lubricant. Typical examples of such closed-celled foam materials that could be used are polystyrene and polyethylene.

In the preferred embodiment, a foam material is employed which compresses approximately 30% under an applied pressure of approximately 40 pounds per square inch. The typical desired pressure for the lubricant within the lubricant chamber 14 is in the range of 10 to 60 pounds. In a typical pumping or mixing application to which the reservoir assembly may be subjected, the back-pressure applied by the external environment would typically fall within the 6 to 12 pound range. It will be understood by those skilled in the art that these numbers are specific to the preferred embodiment being described, and that the invention is not to be limited by such ranges.

Similarly, the extent to which the inner cavity is filled by the foam material can significantly vary. For example, it may be desirable to fill the internal cavity from anywhere to 10% to 80% of the reservoir's capacity. Those skilled in the art will readily conceive of various combinations of lubricant pressure, percentage of cavity fill and density and types of foam materials that provide the optimum combination of parameters for the particular lubrication application at hand.

Figure 4:
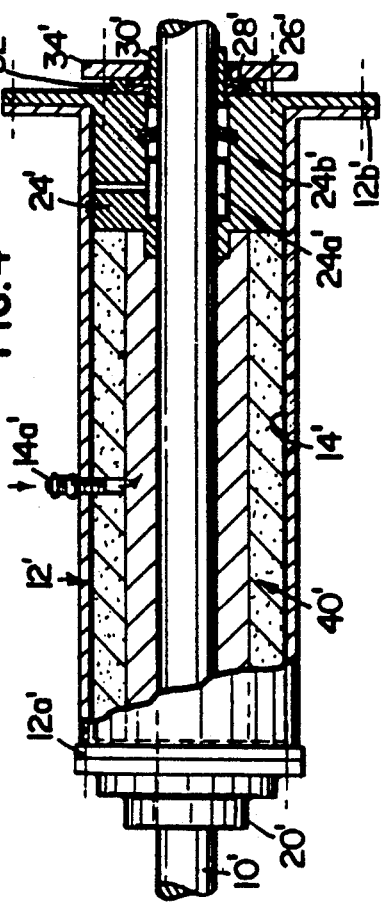
FIG. 4 is a cross-sectional view of the lubricating structure of FIG. 3, generally taken along the Line 4—4 of FIG. 3.

The principles of this invention are applicable to lubrication chambers of varied sizes and configurations, as will be readily appreciated by those skilled in the art. An example of a cylindrical such lubrication chamber with an accompanying cylindrically shaped reservoir closed-celled foam material liner is illustrated in FIGS. 2 and 3. Parts of comparable function in the embodiment disclosed in FIGS. 3 and 4 are labeled by comparable numbers as their counterparts in FIGS. 1 and 2, with the addition of a prime designation. In comparing the structure of FIGS. 1, 2 with that of FIGS. 3, 4 it will be noted that the equivalent of the rear bearing plate 18 is not necessary in the FIGS. 3, 4 embodiment since the mounting flange of the rear bearing 24' directly performs the closure function for closing the open end of the cylindrical internal chamber 14'.

It will be appreciated, that the compressive material need not be limited to configurations which define liner members for the inner cavity of the lubrication reservoir. Such filler materials for the lubricant storage reservoir could assume any configuration and shape and could represent any number of pieces. As an example, FIG. 5 illustrates a lubricant storage reservoir generally of the type illustrated in FIGS. 1 and 2 wherein the foam lining material 40 has been replaced by a plurality of spherical foam members which randomly fill the volume of the inner cavity 14 to the desired degree.

Figure 5:
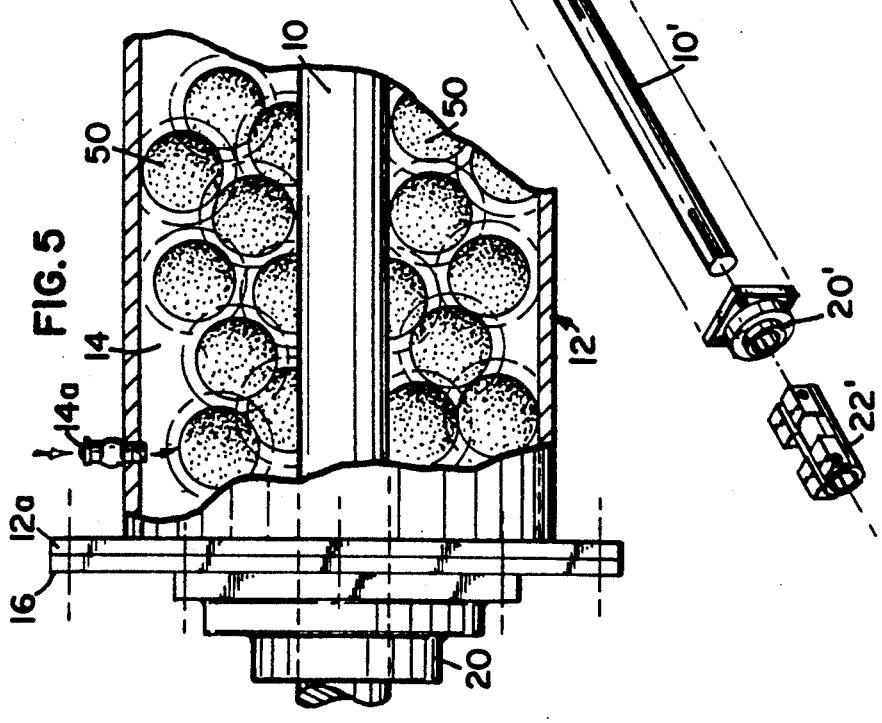
FIG. 5 is an enlarged fragmented view of a lubricant-containing chamber such as that of the structures of FIGS. 1 and 2, illustrating use of circularly shaped foam material pieces within the chamber.

With reference to FIGS. 2, 4 and 5, the solid peripheral outline of the variously configured foam members 40, 40', and 50 respectively represents the shape that the foam member would assume in its compressed form when under pressure by lubricant within the inner cavity 14. The dashed lines peripherally located adjacent the solid lines of the foam filler material represent the shape that such foam components would assume when lubricant pressure is removed therefrom. Obviously, as lubricant leaves the inner cavity 14 by reason of seepage through the lip seals of the rear bearing 24 and through the outrigger seal members 26 and 28, the foam material will gradually expand back to its original shape, and in the process apply uniform compressive force to the lubricant within the inner cavity 14 so as to maintain a positive pressure differential between the inner cavity and the external environment. Such uniform positive pressure differential ensures protection of the bearing surfaces of the rear bearing 24 and helps to maintain the integrity of the seals within the rear bearing 24 and the outrigger lip seals. As will be appreciated by those skilled in the art, the amount of foam material to be used within the inner cavity and the type thereof will be designed so as to maximize the interval between recharging of the inner cavity by lubricant through the lubricant supply tube, since such interval frees an operator of the apparatus who would otherwise be required to continually monitor the application of lubricant to the lubricant storage reservoir.

Other modifications of the invention will be apparent to those skilled in the art in view of the foregoing descriptions. These descriptions are intended to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and broad scope of the appended claims are covered.

What is claimed is:

1. A method of pressurizing a sealed lubricant-containing reservoir of the type having an internal wall defining an internal cavity comprising the steps of:
   (a) at least partially filling the reservoir internal cavity with a closed-cell compressible memory retentive material;
   (b) adding lubricant to the reservoir; and
   (c) pressurizing the reservoir by adding lubricant, to a reservoir pressure so as to compress said memory retentive material by pressing said lubricant directly against and into said memory retentive material; whereby if said reservoir pressure tends to decrease, said memory retentive material expands to maintain the reservoir pressure.

2. The method as recited in claim 1, wherein the step of partially filling said reservoir with foam material comprises filling said reservoir with said foam materials from about 10% to 80% of the reservoir's capacity.

3. The method as recited in claim 2, wherein the foam material fills from about 30% to 60% of the reservoir's capacity.

4. The method as recited in claim 1, wherein said foam material is selected to be of a type that does not chemically react with said lubricant.

5. The method as recited in claim 1, wherein said memory retentive material is positioned within said reservoir internal cavity so as to at least partially line said internal wall thereof.

6. The method as recited in claim 1, wherein the step of partially filling the reservoir with said memory retentive material comprises distributing a plurality of discrete such memory retentive material pieces within said cavity.

7. The method as recited in claim 1, wherein said pressurizing step comprises pressurizing said chamber so as to compress said memory retentive material from about 10% to 50% relative to its uncompressed state.

8. A method of providing lubrication to a bearing apparatus of the type having a sealable lubricant reservoir operatively connected to provide lubrication to a bearing surface and at least one seal member for sealing said reservoir and protecting said bearing surface from an external environment, comprising the steps of:
   (a) at least partially filling the reservoir with closed-cell foam material;
   (b) adding lubricant to the reservoir such that said lubricant directly engages and penetrates into voids of said foam material; and (c) pressurizing the reservoir to a positive pressure relative to that of the external environment, wherein said lubricant is urged toward said bearing surface as said foam material expands.

9. The method as recited in claim 8 including the step of pressurizing said reservoir relative to said external environment such that lubricant from said reservoir is allowed to seep past said seal member to said external environment, thereby protectively coating said seal member with said lubricant.

10. The method as recited in claim 8, wherein said step of pressurizing said reservoir is performed by adding lubricant to the reservoir.

11. The method as recited in claim 9, wherein said foam material expands to fill the reservoir as lubricant passes to said external environment; and further including the step of periodically repressurizing said reservoir so as to recompress said foam material during operation of said bearing apparatus.

12. A dynamically pressurized lubricant-providing apparatus comprising:
   (a) a lubricant-containing reservoir defining a pressurizable internal chamber having an inlet port for accepting lubricant to said chamber and an outlet port arranged and configured to deliver lubricant from said chamber;
   (b) means for selectively sealing said inlet port;
   (c) seal means operatively connected at said outlet port for sealably closing said internal chamber to an external environment; and
   (d) compressible closed-cell memory retentive foam material at least partially filling said internal chamber, said material being exposed within said internal chamber for direct engagement with and compressible by lubricant within said chamber; wherein said foam material when engaged by said lubricant accepts lubricant within any voids in the foam material and when compressed provides biasing pressure to lubricant within said chamber for maintaining a positive pressure differential across said seal means as measured from the inside of said internal chamber to said external environment.

13. The apparatus as recited in claim 12, further including bearing means operatively connected adjacent said chamber outlet port so as to receive lubricant from said internal chamber.

14. The apparatus as recited in claim 13, wherein said bearing means includes at least one bearing surface housed within said internal chamber, and wherein said seal means is operatively disposed so as to protect said bearing surface from said external environment.

15. The apparatus as recited in claim 12, wherein said means for sealing said inlet port includes means for injecting lubricant under pressure to said internal chamber, wherein said injected lubricant compresses said memory retentive material.

16. The apparatus as recited in claim 12, wherein said memory retentive material is generally configured to form a lining of said internal chamber.

17. The apparatus as recited in claim 12, wherein said memory retentive material when uncompressed, fills from about 10% to 80% of said internal chamber.

18. The apparatus as recited in claim 12, wherein said memory retentive material is selected to be of a type that does not chemically react with a lubricant for which the apparatus is designed to be used.

19. The apparatus as recited in claim 12, wherein said memory retentive material comprises a plurality of discrete such material pieces randomly distributed within said internal chamber.

20. The apparatus as recited in claim 12, wherein said reservoir and said seal means are cooperatively designed so as to maintain said pressure differential at a predetermined pressure level; and wherein said memory retentive material is compressible from about 10% to 50% relative to its uncompressed state at said predetermined pressure level.

21. A dynamically pressurized lubricated bearing apparatus for supporting a rotating shaft about a shaft axis comprising:
   (a) a lubricant reservoir having an outer shell defining an enclosed internal cavity, said shell having a first port arranged and configured to enable a rotatable shaft to pass therethrough so as to extend from said internal cavity and through said first port to an external environment, and an inlet port suitable for receiving lubricant into said internal cavity;
   (b) bearing means cooperatively mounted relative to said first port for rotatably supporting a shaft for rotation about its axis through said first port;
   (c) seal means operatively mounted at said first port and in cooperative engagement with said shaft for sealably closing said internal cavity about said shaft from said external environment and for protecting said bearing means from said external environment; and
   (d) exposed compressible closed-celled foam means operatively disposed within said internal cavity for direct engagement by a lubricant, for maintaining, when compressed, pressure on lubricant within said internal cavity so as to create a positive pressure differential across said seal means as measured between said internal cavity and said external environment.

* * * * *